United States Patent
Zlotnik et al.

(10) Patent No.: US 12,554,439 B2
(45) Date of Patent: Feb. 17, 2026

(54) COUNTER QUEUES FOR A SYSTEM ON CHIP

(71) Applicant: Micron Technology, Inc., Boise, ID (US)

(72) Inventors: Leon Zlotnik, Camino, CA (US); Leonid Minz, Beer Sheva (IL)

(73) Assignee: Micron Technology, Inc., Boise, ID (US)

( * ) Notice: Subject to any disclaimer, the term of this patent is extended or adjusted under 35 U.S.C. 154(b) by 9 days.

(21) Appl. No.: 18/630,313

(22) Filed: Apr. 9, 2024

(65) Prior Publication Data

US 2024/0354031 A1   Oct. 24, 2024

Related U.S. Application Data

(60) Provisional application No. 63/460,438, filed on Apr. 19, 2023.

(51) Int. Cl.
*G06F 3/06* (2006.01)

(52) U.S. Cl.
CPC ......... *G06F 3/0659* (2013.01); *G06F 3/0625* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 5,768,572 A | * | 6/1998 | George | G06F 9/4825 |
| | | | | 713/502 |
| 5,873,089 A | | 2/1999 | Regache | |
| 6,763,476 B1 | * | 7/2004 | Dangi | H04L 49/9031 |
| | | | | 713/502 |
| 10,719,268 B2 | | 7/2020 | Gould et al. | |
| 11,017,493 B2 | | 5/2021 | Gould et al. | |
| 2005/0050188 A1 | * | 3/2005 | Davis | G06F 16/902 |
| | | | | 707/E17.038 |
| 2007/0147394 A1 | * | 6/2007 | Wilkinson | G06F 1/14 |
| | | | | 370/398 |
| 2008/0013450 A1 | * | 1/2008 | Worley | G06F 16/2477 |
| | | | | 370/230 |
| 2014/0344820 A1 | * | 11/2014 | Kumar | G06F 9/4843 |
| | | | | 718/103 |
| 2019/0235935 A1 | * | 8/2019 | Milliron | G06F 9/466 |

OTHER PUBLICATIONS

Varghese, George, and Anthony Lauck. "Hashed and hierarchical timing wheels: efficient data structures for implementing a timer facility." IEEE/ACM transactions on networking 5.6 (2002): 824-834. (Year: 2002).*

* cited by examiner

*Primary Examiner* — Nicholas J Simonetti
(74) *Attorney, Agent, or Firm* — Brooks, Cameron & Huebsch, PLLC

(57) ABSTRACT

A method includes reading, from a memory array, a first counter identifier (ID) based on a pointer corresponding to an address location in the memory array in which the first counter ID is stored. The method includes incrementing the pointer to correspond to an address location in the memory array in which a second counter ID is stored and reading, from the memory array the second counter ID based on the pointer corresponding to the address location in the memory array in which the second counter ID is stored.

18 Claims, 6 Drawing Sheets

_US 12,554,439 B2_

COUNTER QUEUES FOR A SYSTEM ON CHIP

PRIORITY INFORMATION

This application claims the benefits of U.S. Provisional Application No. 63/460,438, filed on Apr. 19, 2023, the contents of which are incorporated herein by reference.

TECHNICAL FIELD

Embodiments of the disclosure relate generally to digital logic circuits, and more specifically, relate to counter queues for a system on chip.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
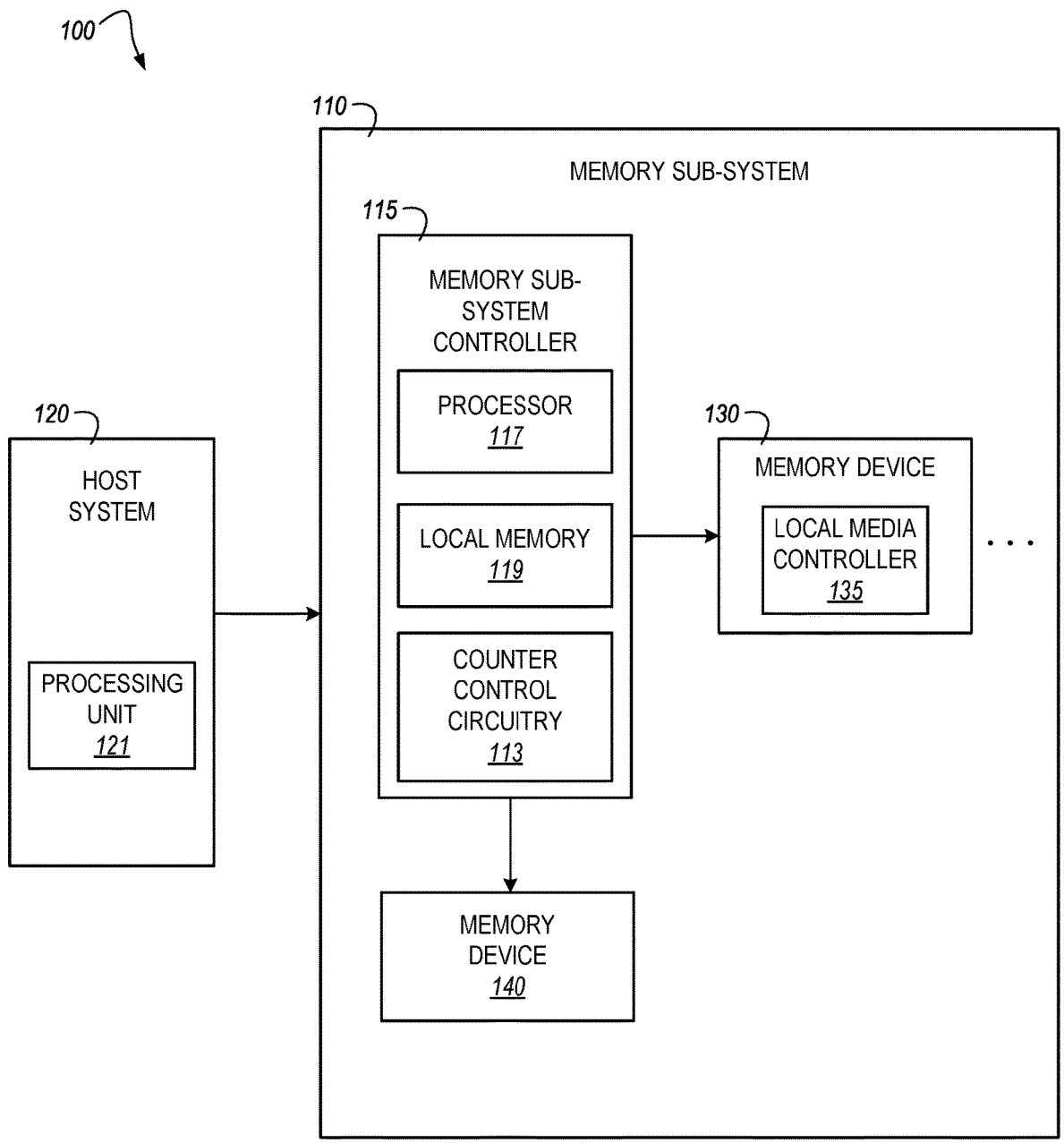
FIG. 1 illustrates an example computing system that includes a memory sub-system in accordance with some embodiments of the present disclosure.

Aspects of the present disclosure are directed to a counter queue system on chip and, in particular, to computing systems that provide counter queues for one or more Systems on Chip (SoC). A computing system (e.g., a host system) can include various computing components, such as a graphics processing unit, an audio processing unit, and/or a memory sub-system. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system (e.g., a computing system) can utilize a memory sub-system that includes one or more components, such as memory devices that store data. The host system can provide data to be stored at the memory sub-system and can request data to be retrieved from the memory sub-system.

During operation of a computing system, memory sub-system, graphics processing unit, etc. and, more specifically to Systems on Chip that operate within these devices, various timers and/or counters are utilized in connection with operation of circuitry associated with the System on Chip. These counters (which may be referred to in the alternative herein as "timers") can be set for different durations of time (e.g., for different quantities of clock cycles) and can be started at different points in time during operation of the memory sub-system. Accordingly, the counters can end (e.g., expire) at different periods in time. In general, when a counter ends or expires, a handler, for example, a firmware and/or hardware handler performs some action to terminate or otherwise indicate that the counter has expired.

In some approaches, a fairly large quantity (e.g., hundreds or more, such as three hundred and twenty (320) or more) independent counters may be employed within a memory sub-system and/or System on Chip (SoC) associated with the memory sub-system. In these approaches, the counters can be configured to expire simultaneously or nearly simultaneously. Once the counters expire, they are generally processed in a random (e.g., unordered) manner, which can lead to scenarios in which the expired counters are not processed according to the order in which they expired. In some other approaches, a heap queue paradigm may be employed to process expired counters. However, utilization of heap queue techniques may limit the ability to process timers during each cycle.

The counters can be utilized for various purposes during operation of a computing system; however, one non-limiting example of how the counters can be utilized includes timing of transactions to be performed using the computing system. For example, the counters can correspond to an amount of time allowed to transpire between performance of read and/or write operations involving memory devices that are provided to the computing system. That is, there may be an amount of time that needs to transpire between performance of a first transaction (e.g., a first read operation) and a second transaction (e.g., a second read operation). Instead of polling the memory device targeted by the (in this example) read operations to determine whether the subsequent transaction can be performed, expiration of a counter can provide an indication that a subsequent (e.g., second in this non-limiting example) transaction can be performed in the absence of polling techniques.

In order to address these and other deficiencies of current approaches, embodiments of the present disclosure provide a memory array (e.g., a volatile or non-volatile array of memory cells) that is configured to store counter identifiers (IDs). As used herein, a "counter ID" generally refers to a label, such as a number, that references a particular counter. For example, a first counter ID can comprise a first label that references a first counter, a second counter ID can comprise a second label that references a second counter, and so on and so forth.

As described in more detail herein, each entry (e.g., address location) in the array can represent one "step clock" or rising edge of a clock cycle. A pointer is provided that cycles through the memory array, moving to a next address location in the memory array at each step clock. The pointer can be used in connection with retrieving (e.g., reading) a counter ID associated with an address location to which the pointer points at a given step clock. That is, the counter ID stored in a particular address location in the memory array can be read when the pointer is pointing to that particular address location. Once the counter ID at that particular address location is read (or it is determined that no counter ID is stored in that particular address location), the pointer is incremented (e.g., at a next step clock) to point to a next address location in the memory array.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

In other embodiments, the voltage sensing circuit 100 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell.

In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include counter control circuitry 113. Although not shown in FIG. 1 so as to not obfuscate the drawings, the counter control circuitry 113 can include various circuitry to facilitate aspects of the disclosure described herein. In some embodiments, the counter control circuitry 113 can include special purpose circuitry in the form of an ASIC, FPGA, state machine, hardware processing device, and/or other logic circuitry that can allow the counter control circuitry 113 to orchestrate and/or perform operations described herein.

In some embodiments, the memory sub-system controller 115 includes at least a portion of the counter control circuitry 113. For example, the memory sub-system controller 115 can include a processor 117 (processing device) configured to execute instructions stored in local memory 119 for performing the operations described herein. In some embodiments, counter control circuitry 113 is part of the host system 110, an application, or an operating system. The counter control circuitry 113 can be resident on the memory sub-system 110 and/or the memory sub-system controller 115. As used herein, the term "resident on" refers to something that is physically located on a particular component. For example, the counter control circuitry 113 being "resident on" the memory sub-system 110, for example, refers to a condition in which the hardware circuitry that comprises the counter control circuitry 113 is physically located on the memory sub-system 110. The term "resident on" may be used interchangeably with other terms such as "deployed on" or "located on," herein.

Figure 2:
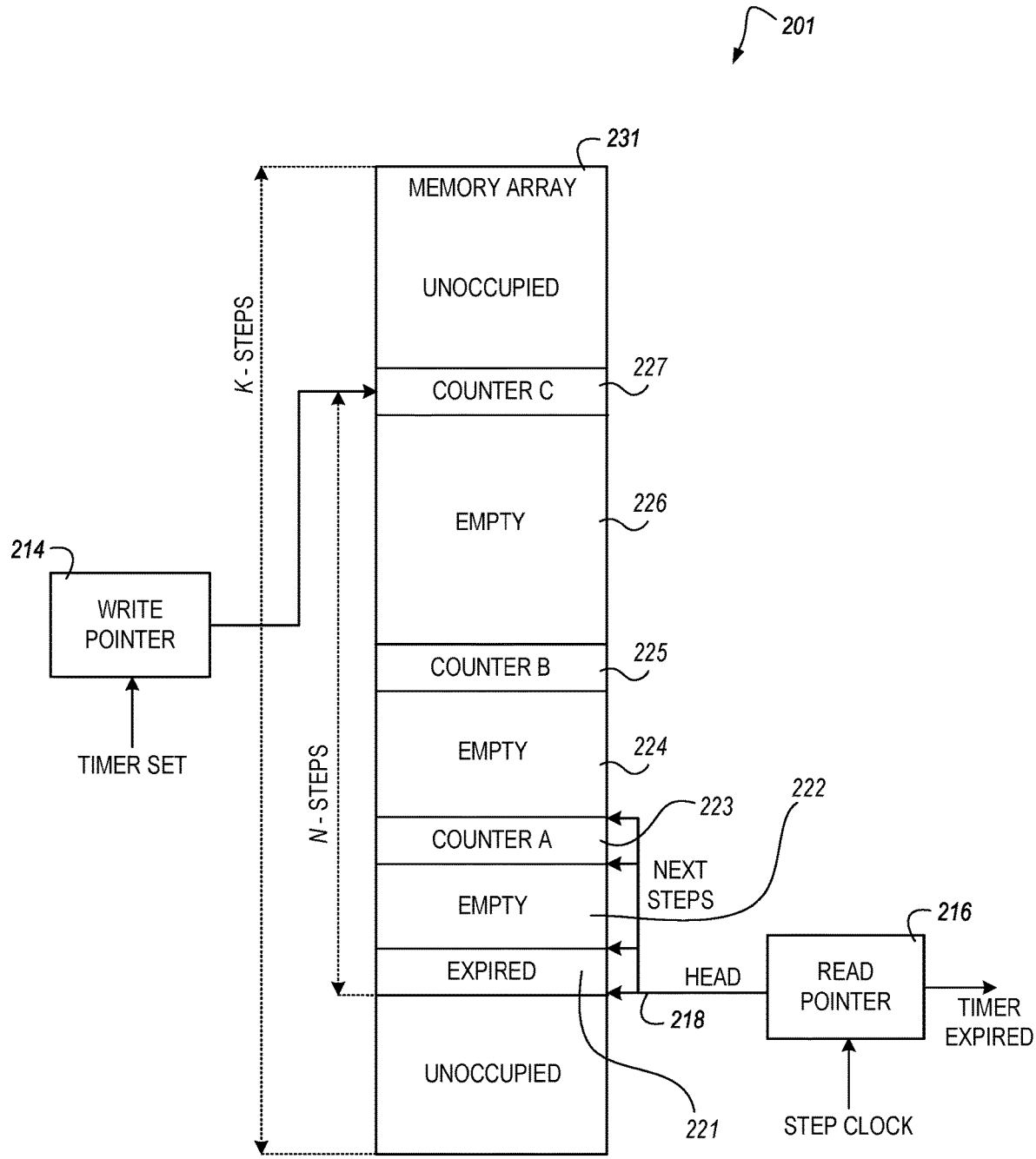
FIG. 2 illustrates an example of a counter queue in accordance with some embodiments of the present disclosure.

FIG. 2 illustrates an example of a counter queue 201 in accordance with some embodiments of the present disclosure. The counter queue 201 includes a memory array 231. The memory array can be part of the memory device 130 and/or the memory device 140 illustrated in FIG. 1. Embodiments are not so limited however and the memory array 231 can be resident on the host system 120 or resident on the memory sub-system 110. In some embodiments, the memory array 231 can be a volatile memory array, such as a DRAM array, SRAM array, etc. or the memory array 231 can be a non-volatile memory array, such as a NAND flash memory array.

The non-limiting example illustrated in FIG. 2 shows a single counter queue 201 with a queue depth of K. That is, the memory array 231 includes K address locations, as indicated by there being "K-STEPS" associated with the memory array 231. As shown in FIG. 2, not every address location may contain data (e.g., a counter and/or corresponding counter ID). For example, the memory array may have address locations that are "unoccupied" and/or "empty," as shown in FIG. 2. Not including the "unoccupied" regions of the memory array 231, there may be "N-STEPS" involving address locations that either (1) contain a counter and/or counter ID (e.g., the regions of the memory array 231 labeled as COUNTER A 223, COUNTER B 225, and COUNTER C 227), (2) are empty (e.g., the regions of the memory array 231 labeled as EMPTY 221 and EMPTY 226), or (3) contain an expired counter and/or expired counter ID (e.g., the region of the memory array 231 labeled EXPIRED 221).

The counter queue 201 further includes a write pointer 214, which can be controlled via a TIMER SET, and a read pointer 216, which can be controlled via a STEP CLOCK. The write pointer 214 can be incremented according to a set time interval to point to address locations in the memory array 231. For example, as shown in FIG. 2, the write pointer 214 is pointing to the COUNTER C 227, which indicates that a counter is to be written to the address location shown as COUNTER C 227 in FIG. 2. In some embodiments, a counter ID that corresponds to, for example, "C" is written to the address location that corresponds to "C," as described herein. Once this counter is written to this address location, a counter can be written to a different address location in the memory array 231. In the event that an attempt to write a new counter to an address location that already includes a (non-expired) counter, the new counter can simply be written to a different address location in the memory array 231. The different address location can be a next available address (e.g., a next empty address location), among other possibilities.

The write pointer 214 is used to calculate and determine an offset from a current position of the read pointer 216. For example, when a particular counter (e.g., the COUNTER C 227) is set, the write pointer 214 can be used to set a timer associated with the counter to a particular number of clock steps (e.g., N steps corresponding to N times the step clock period) apart from the read pointer 216. In a non-limiting example, the write pointer 214 can determine an offset from the read pointer 214 based on a current read pointer 214 value (e.g., as shown at the head 218 of the read pointer 214) plus N, which corresponds to the COUNTER C 227 as shown in FIG. 2.

The read pointer 216 can be incremented according to a set time interval to point to address locations in the memory array 231. For example, as shown in FIG. 2, the head 218 of the read pointer 216 is pointing to the EXPIRED 221 address location, which indicates that a counter and/or counter ID is to be read from the address location shown as EXPIRED 221 in FIG. 2. Once this counter and/or counter ID is read from this address location, the read pointer 216 is incremented to point to a different (subsequent) address location in the memory array 231 and a counter and/or counter ID can be read from this different (subsequent) address location in the memory array 231, as indicated by the NEXT STEPS shown in FIG. 2.

Although described in terms of a single counter being stored in a single address location in the memory array 231, embodiments are not so limited. For example, two or more counters and/or counter IDs can be written to a single address location in the memory array 231. In these embodiments, multiple write pointers 214 and read pointers 216 may be employed to correspond to each of the counters and/or counter IDs written to the memory array 231. In a simplified example in which two counters and/or counter IDs are written to a single address location in the memory array 231, there can be two write pointers 214 and/or two read pointers 216 that handle respective counters and/or counter IDs—a first read pointer 216 and a first write pointer 214 that can be associated with first counters/counter IDs stored by the memory array 231 and a second read pointer 216 and a second write pointer 214 that can be associated with second counters/counter IDs stored by the memory array 231. In general operation of the counter queue 201 is the same as the examples given herein in which a single counter and/or counter ID is stored in a single address location in the memory array 231. Further, embodiments are not limited to two counters and/or counter IDs per address location and greater than two counters and/or counter IDs per address location are contemplated within the scope of the disclosure. Several non-limiting examples are provided below to further clarify these aspects of the disclosure.

In one non-limiting example, there may be a single read pointer 216 and multiple counters/counter IDs can be stored in a single (particular) address location of the memory array 231. In this non-limiting example, the counters/counter IDs that are stored in the will be read from the particular (single) address location concurrently. That is, if multiple counters/counter IDs are stored in a single address location, when the read pointer 216 targets that particular address location, all of the counters stored in the particular address location can be read and/or expired concurrently.

In another non-limiting example, multiple read pointers 216 can be employed to target and read counters/counter IDs from the memory array 231. In this non-limiting example, one particular read pointer 216 can serve as a primary read pointer to perform the operations generally described herein and one or more additional read pointers can be employed for other specific purposes. For example, the one or more additional read pointers can run ahead of the primary read pointer and can be used to alter and/or remove certain counter IDs based on various criteria. That is, in a scenario in which it is determined that a quantity of counter IDs that meet a criterion (e.g., meet or exceed some value) should be removed from the memory array 231, the one or more additional read pointers can be utilized to target and remove these counter IDs from the memory array 231 prior to the primary read pointer being incremented to an address location that includes such a counter ID. This can allow for a reduction of stored data in the memory array 231 (because these counter IDs will occupy space in the memory array 231 at a particular address location and subsequent counters will not be able to be stored in the memory array 231 until these previous counters are targeted, read, and/or expired from the particular address location.

In yet another non-limiting example, multiple read pointers 216 can be employed to focus on certain portions of the memory array 231. For example, in some embodiments, a first read pointer 216 can be associated with a first half of the address locations in the memory array 231 and a second read pointer 216 can be associated with a second half of the address locations in the memory array 231 (although embodiments are not limited to two read pointers focusing on only half of the address locations of the memory array 231 and embodiments in which greater than two read pointers associated with greater than two sections of the memory array 231 are contemplated). In this particular non-limiting example, the read pointers 216 can operate in a manner that sections of the memory array 231 associated with each of the read pointers 216 can function as if the sections of the memory array 231 targeted thereby are independent memory arrays whether or not the actual physical memory array 231 is a single memory array or is multiple memory arrays located on different dice, substrates, etc.

In a non-limiting example, a max timeout value for completing each counter in the memory array 231 is given by (K−1)*S, where K is the queue depth and S is a quantity of step clocks (e.g., step clock increments) to read or write each counter and/or counter ID from or to the memory array 231. Continuing with this non-limiting example, suppose the queue depth of the memory array 231, K=320, and the maximum amount of time required to read or write each counter and/or counter ID is 64 microseconds (μs). The period of the step clock, S, is then equal to 0.2 μs (the maximum amount of time required to read or write each counter and/or counter ID divided by K).

Similarly, the max timeout value for completing each counter in the memory array 231 when there are fewer than K counters is given by (N−1)*S, where N is the quantity of address locations that are occupied (e.g., the regions of the memory array that are not designated as "unoccupied" in FIG. 2) and S is a quantity of step clocks (e.g., step clock increments) to read or write each counter and/or counter ID from or to the memory array 231. Using S=0.2 us from above and using an arbitrary value of 122 for N (i.e., N=122), we find that, in this particular example, the max timeout value for completing each counter in the memory array 231 is 24.4 μs. It is reiterated that the foregoing numerical examples are merely illustrative and are not intended to limit the scope of the disclosure. Accordingly, other values for K, N, S, etc. can be used and are contemplated within the scope of the disclosure.

Continuing with this non-limiting example, reading or writing a counter ID for each of the N-STEPS shown in FIG. 2 takes 24.4 μs and the read pointer 216 increments to a new address location of the memory array 231 every 0.2 μs. In this manner, a counter and/or counter ID can be read from a particular address location in the memory array every 0.2 μs as the read pointer 216 is incremented every 0.2 μs to a subsequent address location in the memory array 231. In some embodiments, the read pointer 216 is incremented in response to a command from a processing device (e.g., the counter control circuitry 113, the controller 115, the processor 117 of FIG. 1) or through the use of clocking circuitry coupled to the write pointer 214 and/or the read pointer 216. Although not explicitly illustrated in FIG. 2, a write base pointer can correspond to the current read pointer 216 and can follow the read pointer 216 as the read pointer 216 is incremented. As mentioned above, every new counter that is set can have a required time and/or clock period associated therewith and be calculated as N+ the write pointer base.

In contrast to the previous approaches discussed above in which hundreds of independent counters are used and therefore incur dynamic and static power continuously during operation of a computing system, aspects of the present disclosure only consume power by the read pointer and write pointer, i.e., when read or write operations are performed in accordance with the read and write pointer targeting a particular address location in the memory array 231. Accordingly, because embodiments herein allow for power to only be consumed by the counter queue 201 in accordance with the read and write pointers, the counter queue 201 and/or the memory array 231 can be put into a retention state in which the counters and/or counter IDs are maintained in the memory array 231 but power consumption is reduced in comparison to previous approaches. In some embodiments, the counter queue 201 and/or the memory array 231 can be put into the retention state between incrementations of the pointer(s) to further mitigate and reduce power consumption of the counter queue 201. Stated alternatively, in previous approaches, the independent counters can each consume power at every clock cycle and, accordingly, the power consumed in such approaches grows generally linearly with the quantity of independent counters present in the system. However, embodiments of the present disclosure consume the same (or very nearly the same) amount of power whether there is only one counter or if the entire memory array 231 is filled with counters.

In some embodiments, the counters and/or counter IDs that are stored in the memory array 231 can be arranged in any order within the memory array 231. Further, the counters can be set for any period of time. Accordingly, in a non-limiting example, one counter may be set for fifty seconds and the next counter may be set for one second, etc. The counters and/or counter IDs will be read from the memory array 231 in an order in which they are stored (e.g., sequentially based on the address location in the memory array 231 in which the counters/counter IDs are written) in the memory array 231. This can lead to scenarios in which the counter queue 201 only experiences one expired counter at any given time, although embodiments are not so limited.

In some embodiments, aspects of the disclosure make it is possible to initiate a counter (e.g., when the write pointer 214 indicates initiation of a counter) and expire a counter (e.g., when the read pointer 216 indicates expiration of a counter) at every clock in a "back-to-back" manner. For example, a first counter can be initiated at a first step clock and can be read (and therefore become expired) "back-to-back" at the next step clock. Embodiments are not so limited, however, and in some embodiments, aspects of the present disclosure can allow for a counter to be read and written in the same clock (e.g., a counter can be set during a same clock as a counter is read). It will be appreciated that this is not possible in previous approaches that, for example, employ a heap queue methodology.

In a non-limiting example, an apparatus (e.g., the counter queue 201) includes a memory array 231 and a processing device (e.g., the counter control circuitry 113, the controller 115, the processor 117 of FIG. 1) coupled to the memory array 231. The processing device can increment a pointer (e.g., the write pointer 214 and/or the read pointer 216) that targets address locations in the memory array 231 in which a plurality of counter identifiers (IDs) are stored. As discussed above, the pointer is incremented after a predetermined period of time, such as the step clock time S described above. For example, in some embodiments, the predetermined period of time corresponds to a quantity of address locations associated with the memory array and a quantity of clock steps associated with reading each of the plurality of counter IDs, as described above.

Continuing with this non-limiting example, the processing device can further cause respective particular counter IDs among the plurality of counter IDs (e.g., the COUNTER A 223, the COUNTER B 225, the COUNTER C 227, etc.) to be read from the memory array 231 when the pointer targets a respective address location in which a respective counter ID is stored. In some embodiments, the processing device can set a counter ID that has been read from the memory array 231 as an expired 221 counter ID, as described in more detail below in connection with FIG. 3.

In the event that the pointer encounters an address location in the memory array 231 that is unallocated (e.g., the EMPTY 222, 224, 226 address locations), the processing device can determine that an address location in the memory array 231 is unallocated if the address location does not contain a counter ID and increment the pointer to an address location adjacent to the address location in the memory array 231 that is unallocated to locate a next respective address location in which a next respective counter ID is stored. In some embodiments, the pointer is still incremented according to the step clock size S through each address location regardless of whether the address location is unallocated or contains a valid counter ID.

In some embodiments, the processing device can determine that the pointer has reached a boundary associated with the memory array 231 and set the pointer to correspond to a particular address location associated with the memory array 231 that does not correspond to the boundary associated with the memory array 231. For example, if the pointer has been incremented such that there is not an adjacent address location in the direction the pointer is moving, the pointer can be set to target a different address location in the memory array 231.

The simplest example of this is to assume that the pointer has been moving from the "bottom" of the memory array 231 (the side closest to the bottom of the page in FIG. 2) upward to the "top" of the memory array 231 (the side closest to the top of the page in FIG. 2). At some point (after N-STEPS, for example), the pointer is targeting the COUNTER C 227 address location. If the pointer is incremented "upward" one more time, the pointer will be pointing to an unoccupied location, which therefore signifies the boundary mentioned above, in the memory array 231. Rather than increment the pointer to the unoccupied region of the memory array 231, the pointer can be set to point to an address location adjacent to the opposite boundary, which in this case would be the address location identified as EXPIRED 221. Embodiments are not so limited, however, and the pointer can be set to target other address locations in the memory array 231 as desired.

For example, if the read pointer 216 is incremented to a position in which the read pointer 216 will target the unoccupied area, it may mean there are no more existing counters in the memory array 231 and hence, there would be no purpose to increment the read pointer 216 any further in a particular direction (until at least one new counter is set). That is, because in general the read pointer 216 clears the memory array 231 (e.g., by reading and expiring counters, as described above) as it is incremented and generally every address location that has been read/expired becomes unoccupied (provided there is no re-launch of any of the counters) there would be no address location containing a valid counter to target with the read pointer 216. In this scenario, incrementation of the read pointer 216 can be suspended until it is determined that one or more new counters have been written to the memory array 231.

However, if the read pointer 216 is incremented to the memory array 231 and the top of the memory array 231 is still occupied and if there is at least one counter still set in the memory array 231 below (i.e., from the bottom to the top of the memory array 231), then the read pointer 216 can be re-set (e.g. "wrapped") to the bottom of the memory array 231 and be incremented from this address location as described herein. In this particular non-limiting scenario, the only unoccupied area in the memory array 231 can be after (above) the topmost existing counter and after the read pointer 216 (since in this example the read pointer 216 is incremented to the topmost occupied position in the memory array 231).

Continuing with this non-limiting example, the processing device can be configured to arrange the counter IDs within the memory array 231 according to various paradigms, such as a time at which each of the counter IDs is set, a duration (e.g., temporal length) of each of the counters, randomly, etc., as described above. In some embodiments, the counters and/or counter IDs can correspond to memory transaction timings, although embodiments are not so limited. In the non-limiting example in which the counters and/or counter IDs correspond to such memory transaction timings, the transactions may be non-deterministic in nature; however, an average amount of time for the transaction to complete may be known. For example, a memory transaction may take 20 µs or less to complete. Instead of constantly polling the memory device to determine if the transaction is complete (as is common in previous approaches), the counters of the present disclosure can be set to a time after which it is certain (or statistically certain) that the memory transaction will be complete. Once the counter has been read and expired, the memory device can be checked to determine if the transaction is complete.

In some embodiments, the memory array 231 and the processing device are deployed on a System-on-Chip (SoC). In these embodiments, the processing device is configured to cause the memory array 231 to enter a retention state subsequent to incrementing the pointer to reduce an amount of power consumed by the SoC, as discussed above.

In another non-limiting example, a non-transitory computer-readable medium (e.g., the machine-readable medium 624 of FIG. 6) can store instructions (e.g., the instructions 626 of FIG. 6) that, when executed by a processing device (e.g., the processing device 602 of FIG. 6, which can be analogous to the counter control circuitry 113, the processor 117, the local media controller 135, the processing unit 121, etc. of FIG. 1) can cause the processing device to increment a pointer that targets address locations in a memory array (e.g., the memory arrays 231/331/431 described herein) in which a plurality of counter identifiers (IDs) are stored. In such embodiments, the pointer is incremented after a predetermined period of time corresponding to a timer associated with at least one of the counter IDs.

In some embodiments, the predetermined period of time corresponds to a quantity of address locations associated with the memory array and a quantity of clock steps associated with reading each of the plurality of counter IDs, as described in more detail in connection with FIG. 2 and FIG. 3, above. In accordance with the disclosure, the instructions can be further executable by the processing device to set a counter ID that has been read from the memory array as an expired counter ID, as discussed above.

The instructions can be further executed by the processing device to cause respective particular counter IDs among the plurality of counter IDs to be read from the memory array when the pointer targets a respective address location in which a respective counter ID is stored. In some embodiments, counter IDs among the plurality of counter IDs can correspond to timing information corresponding to respective chains of flip-flops coupled to the processing device, although embodiments are not so limited.

As discussed above in more detail, the instructions can be executed by the processing device to determine that the pointer has reached a boundary associated with the memory array and set the pointer to correspond to a particular address location associated with the memory array that does not correspond to the boundary associated with the memory array. Further, as discussed above in more detail, in some embodiments, the instructions can be executed by the processing device to cause the memory array to enter a retention state subsequent to incrementing the pointer to reduce an amount of power consumed by a computing system in which the processing device is deployed.

Figure 3:
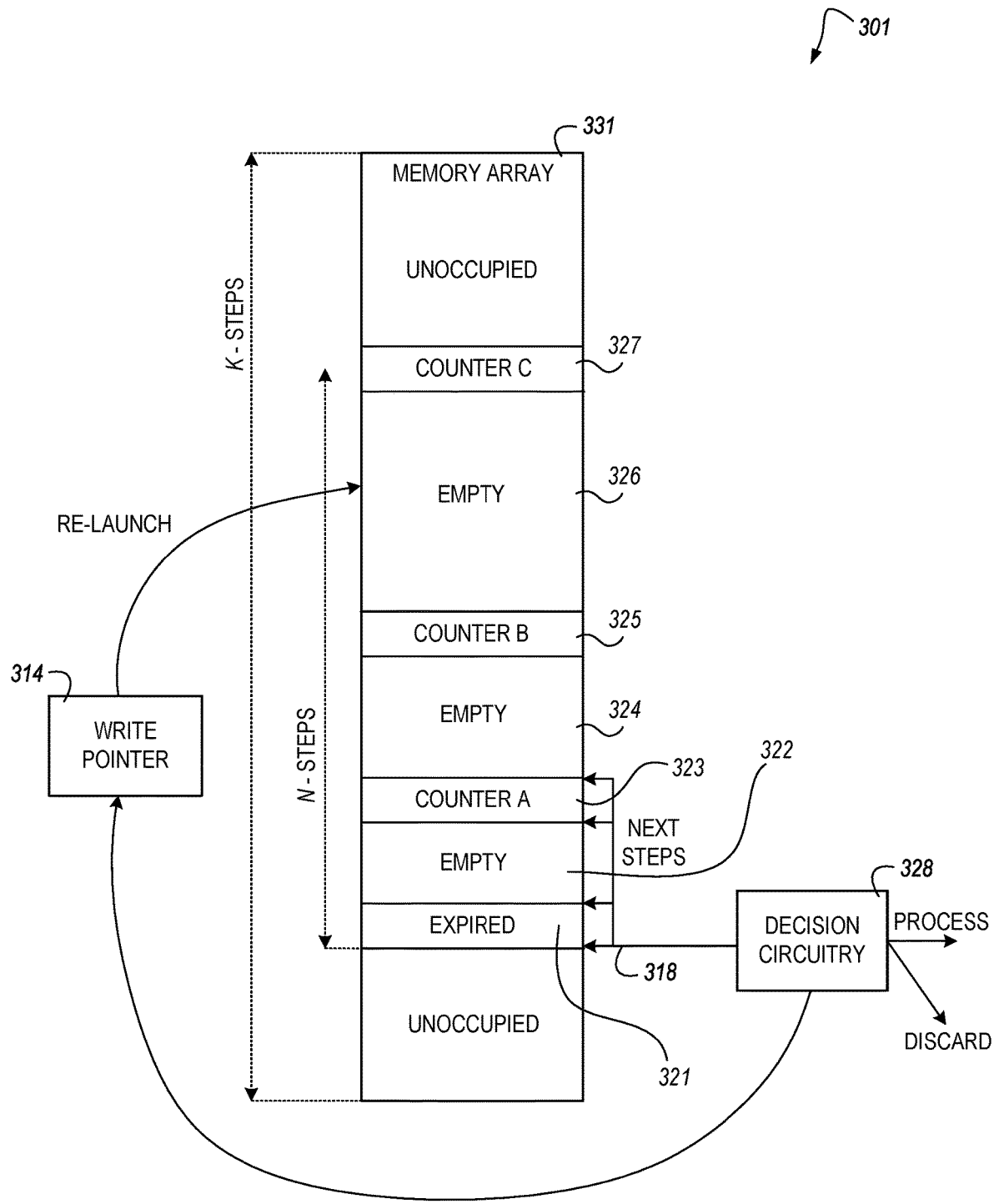
FIG. 3 illustrates another example of a counter queue in accordance with some embodiments of the present disclosure.

FIG. 3 illustrates another example of a counter queue 301 in accordance with some embodiments of the present disclosure. More specifically, FIG. 3 and the accompanying description generally describe potential actions that may be taken when one of the counters is determined to be expired. The counter queue 301 can be analogous to the counter queue 201 illustrated in FIG. 2. In addition to the components of the counter queue 301 that are analogous to those described in connection with FIG. 2, the embodiments illustrated in FIG. 3 further includes decision circuitry 328 coupled to the memory array 331.

The decision circuitry 328 can include hardware, logic, processing resources that can execute instructions to determine whether a particular counter is to be processed, discarded, or re-launched. In some embodiments, the decision circuitry 328 can include and/or be coupled to a memory resource that can store an exception list that can be accessed to determine an action to take when a pointer (e.g., the pointers described above in connection with FIG. 2) targets a particular counter that is expired or is expected to be expired in accordance with the formulae discussed above in connection with FIG. 2.

The exception list can be formatted in various ways, but in a non-limiting, illustrative example in which generalized vectors are utilized by the exception list, the counter ID can be represented as X, an action can be represented as Y, and a re-launch can be represented as Z, where X, Y, and Z are fields that represent a number of bits, associated with each of the vectors. In some embodiments, the value of Y can be less than the value of X and/or Z. For example, the "action" may be represented in Boolean terms as an indication to take an action (e.g., the value of the field Y=1) or to not take an action (e.g., the value of the field Y=0), while the counter ID vector and/or the re-launch vector may include a greater quantity of bits than the action vector, although embodiments are not so limited.

In some embodiments, the action vector Y can provide an indication as to whether or not an action involving a counter ID is to be taken. For example, the action vector can be a 2-bit field that can allow for a determination to be made as to whether a corresponding counter ID should be processed, discarded, or re-launched.

In this non-limiting example, if the re-launch vector is a 9-bit field (e.g., having values from zero to five hundred and eleven) that corresponds to the maximum number of steps (e.g., N steps) when there are five hundred and twelve address locations in the memory array 231. In this example, the write pointer 214 can use the value indicated by the re-launch vector to calculate an address location in the memory array 231 in which a counter ID should be written when performing a re-launch operation. In some embodiments, values included in the re-launch vector can be used to determine that the corresponding counter should be extended (e.g., re-launched multiple times) to allow for completion of said corresponding counter. Embodiments are not so limited, however, and in some embodiments, the re-launch vector (and/or values corresponding thereto) can be stored in the memory array 331 to allow all counters being relaunched and achieve timeouts longer than those given by $(K-1)*S$, described above.

Figure 4A:
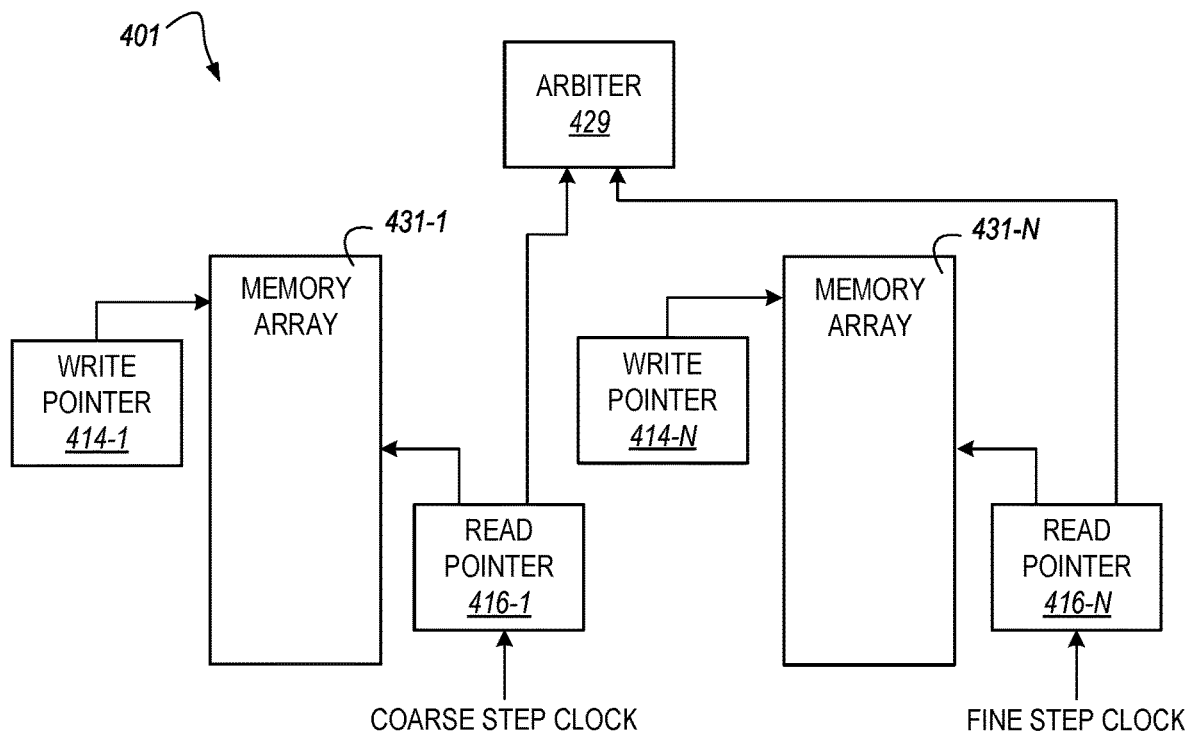
FIG. 4A illustrates an example of a multi-counter queue system in accordance with some embodiments of the present disclosure.

FIG. 4A illustrates an example of a multi-counter queue system 401 in accordance with some embodiments of the present disclosure. The memory arrays 431-1 to 431-N (referred to generally herein as the memory arrays 431) of FIG. 4A and FIG. 4B can be analogous to the memory array 231/331 illustrated in FIG. 2 and FIG. 3, herein. Further, the write pointers 414-1 to 414-N (referred to generally herein as the write pointers 414) and the read pointers 416-1 to 416-N (referred to generally herein as the write pointers 416) of FIG. 4A and FIG. 4B can be analogous to the write pointer 214/314 and the read pointer 216/316 illustrated in FIG. 2 and FIG. 3, herein. In addition, the multi-counter queue system 401 illustrated in FIG. 4A and FIG. 4B includes an arbiter 429 which is coupled to the read pointers 416-1 to 416-N in FIG. 4A and coupled to the read pointer 416-N in FIG. 4B. The arbiter 429 can be used to determine which counter (e.g., which expired counter) should be advanced. That is, the arbiter 429 can determine that a fine step counter should be prioritized over a coarse step counter, or vice versa, although embodiments are not so limited.

In some embodiments, the memory arrays 431-1 to 431-N can store counters (as described above) that have different timing resolutions. For example, the memory array 431-1 can receive a coarse clock signal that may cause the pointers to move through the counters in the memory array 431-1 with a resolution of milliseconds (ms) and the memory array 431-N can receive a fine clock signal that may cause the pointers to move through the counters in the memory array 431-1 with a resolution of microseconds (μs). It will however be appreciated that these enumerated timing resolutions are merely illustrative and other timing resolutions can be used by the memory array 431-1 and/or the memory array 431-N.

By providing multiple memory arrays 431 that are able to operate at different timing resolutions, it is possible to more efficiently organize the counters based on different timing requirements for different transactions processed by the computing system. For example, there may be a large difference in timing between read operations involving a memory device in the computing system and erase/program operations involving the memory device. In this instance, the multi-timer queue system 401 illustrated in FIG. 4A and FIG. 4B, can utilize one memory array 431-1 for timing operations involving erase/program operations involving the memory device and another memory array 431-N for timing operations involving read operations involving the memory device. Embodiments are not limited to this particular example, and it will be appreciated that foregoing non-limiting example is illustrative in nature.

Figure 4B:
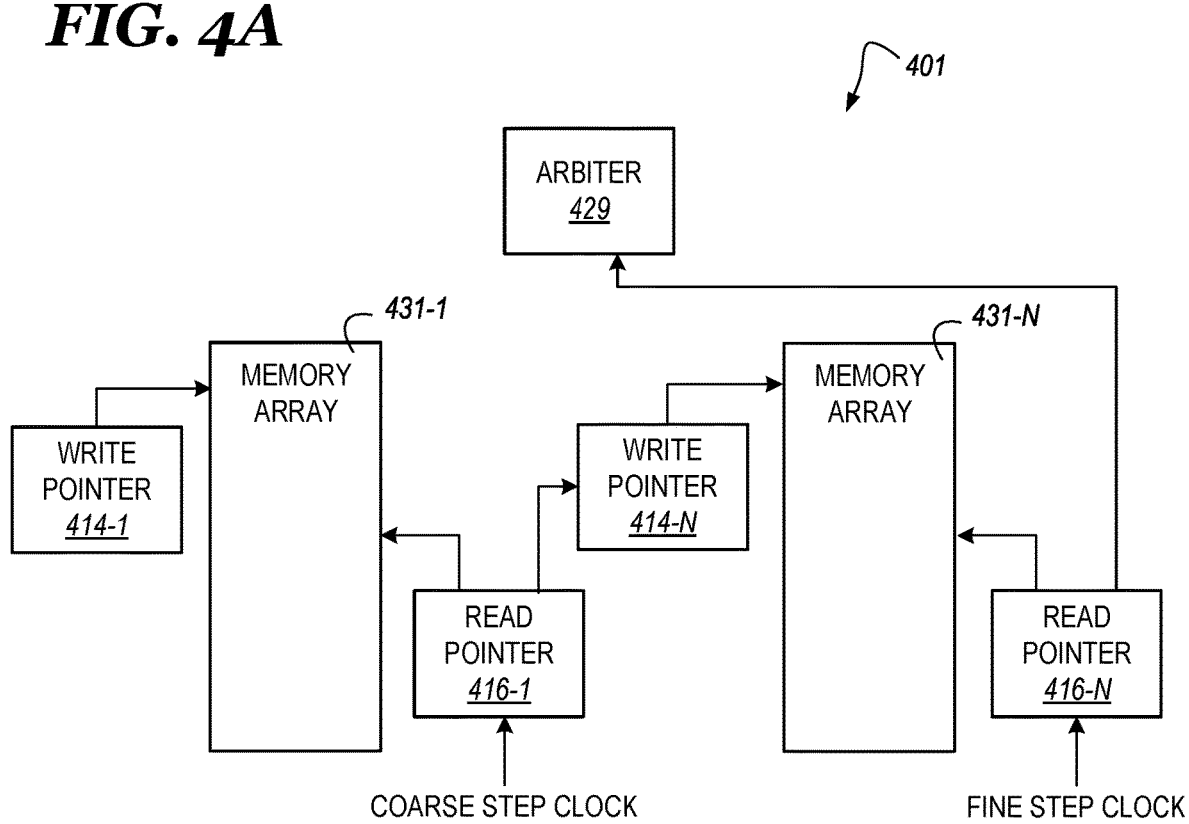
FIG. 4B illustrates another example of a multi-counter queue system in accordance with some embodiments of the present disclosure.

FIG. 4B illustrates another example of a multi-counter queue system 401 in accordance with some embodiments of the present disclosure. The multi-counter queue system 401 of FIG. 4B is generally identical to the multi-timer queue system 401 of FIG. 4A, however, in the example illustrated in FIG. 4B, the read pointer 416-1 is used to launch the write pointer 414-N. Accordingly, in this example, the read pointer 416-N is coupled to the arbiter 429 (as opposed to both read pointers 416-1 to 416-N being coupled to the arbiter 429 as shown in FIG. 4A).

The embodiments illustrated in FIG. 4B can allow the addition of higher resolution counters without necessarily requiring that the size of the memory array 431 is significantly increased. For example, if the memory array 431-1 includes one thousand elements that have a step clock that operates in ms and the memory array 431-N includes one thousand elements that have a step clock that operates in μs, embodiments of the present disclosure allow for counters spanning from 1 μs up to 999,999 μs with the resolution of 1 μs to be provided to the computing system without requiring a re-launch operation to be performed.

Figure 5:
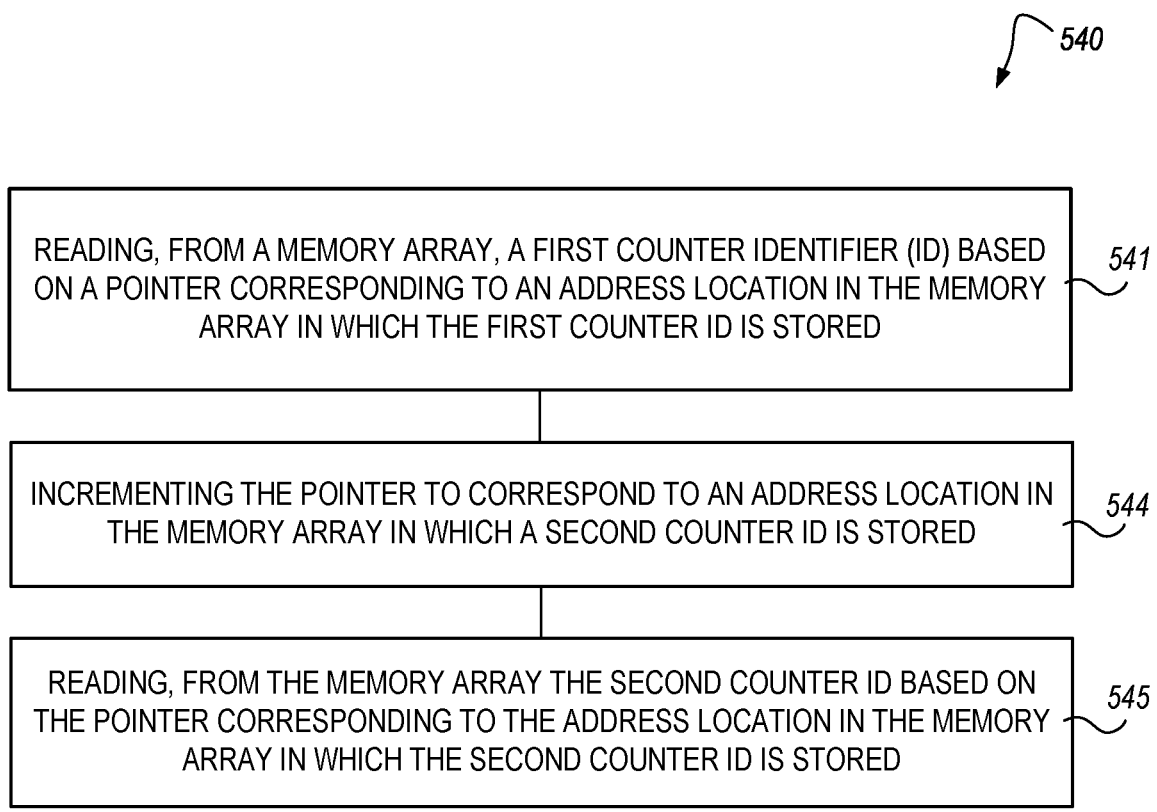
FIG. 5 is a flow diagram corresponding to a method for a counter queue system on chip in accordance with some embodiments of the present disclosure.

FIG. 5 is a flow diagram corresponding to a method 540 for a counter queue system on chip in accordance with some embodiments of the present disclosure. The method 540 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 540 is performed by the counter control circuitry 113 of FIG. 1 and/or or the counter queue 201/301/401 illustrated in FIG. 2, FIG. 3, and FIGS. 4A-4B, herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 541, the method 540 includes reading, from a memory array, a first counter identifier (ID) based on a pointer corresponding to an address location in the memory array in which the first counter ID is stored. The memory array can be analogous to the memory array 231/331/431 illustrated in FIG. 2, FIG. 3, and/or FIGS. 4A-4B, herein. The pointer can be analogous to the pointers (e.g., the write pointer 214 and/or the read pointer 216) described in connection with FIG. 2, FIG. 3, and/or FIGS. 4A-4B, herein.

At operation 543, the method 540 includes incrementing the pointer to correspond to an address location in the memory array in which a second counter ID is stored. As described above, the method 540 can include incrementing the pointer to correspond to the address location in the memory array in which the second counter ID is stored after a predetermined amount of time. For example, the pointer can be incremented according to the step clock timing described above. In some embodiments, the method 540 can include incrementing the pointer to correspond to an address location in the memory array in which a third counter ID is stored after the predetermined amount of time. That is, the pointer can be incremented at a given time to target consecutive address locations in a memory array, as discussed in more detail above.

At operation 545, the method 540 includes reading from the memory array the second counter ID based on the pointer corresponding to the address location in the memory array in which the second counter ID is stored. As the counters and/or counter IDs are read from the memory array, the method 440 can include setting the first counter ID as expired in response to reading the first counter ID from the memory array and/or setting the second counter ID as expired in response to reading the second counter ID from the memory array, as described on more detail in connection with FIG. 3, herein.

The method 540 can include organizing the first counter ID, the second counter ID, and subsequent counter IDs within the memory array according to a time at which each of the counter IDs is set. For example, as discussed above, because the read pointer 216 are incremented from one adjacent address location to a next adjacent address location, counters and/or counter IDs that are written to the memory array 231 can be ordered chronologically with respect to the time that each counter and/or counter ID is written to the memory array 231.

In some embodiments, the method 540 can include determining that the pointer has reached a boundary associated with the memory array and setting the pointer to correspond to a particular address location associated with the memory array that does not correspond to the boundary associated with the memory array. This scenario is described in more detail in connection with FIG. 2, FIG. 3, and/or FIGS. 4A-4B, herein.

Figure 6:
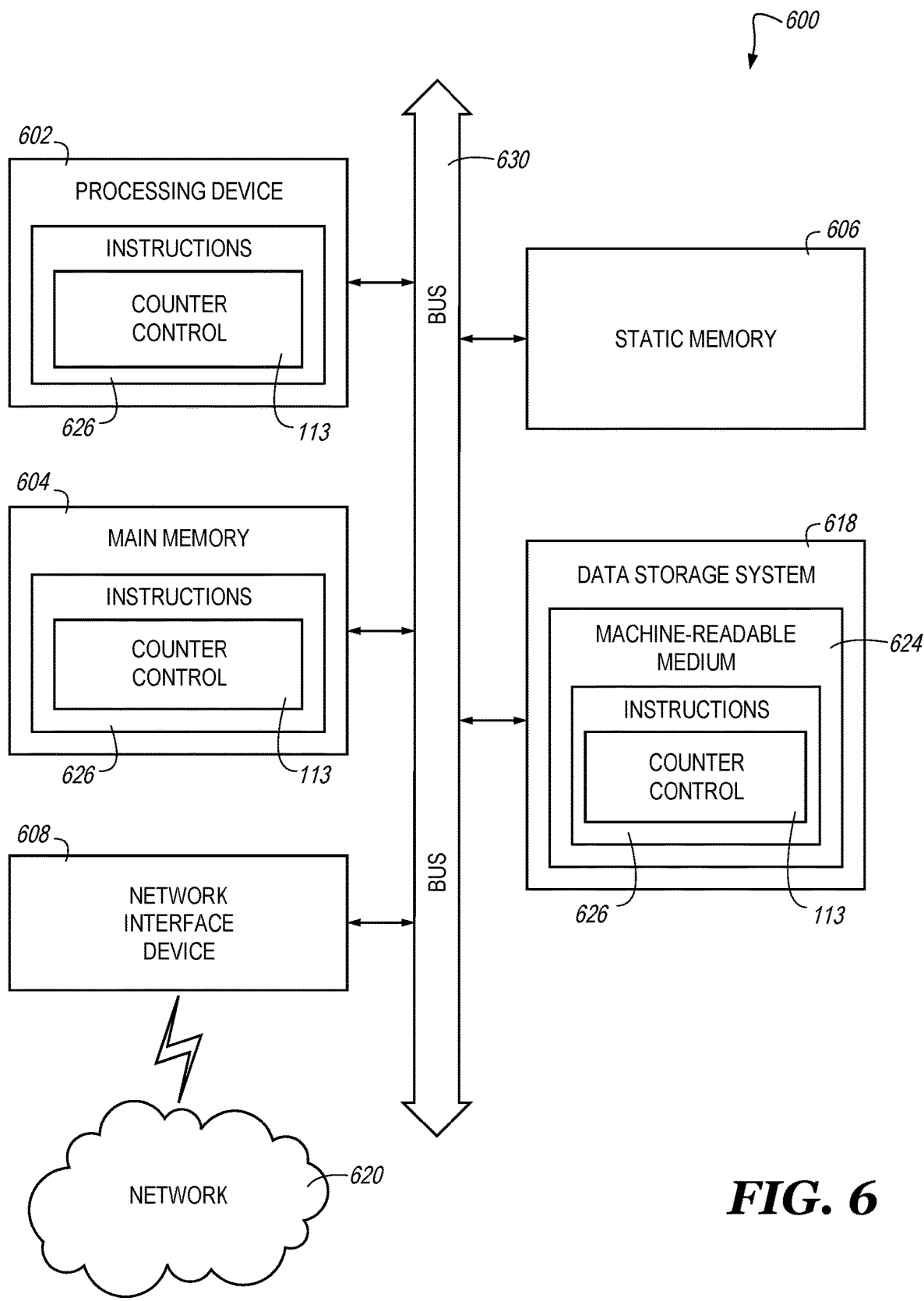
FIG. 6 is a block diagram of an example computer system in which embodiments of the present disclosure may operate.

FIG. 6 is a block diagram of an example computer system in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the thermal control circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to thermal control circuitry (e.g., the thermal control circuitry 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
reading, from a memory array, a first counter identifier (ID) based on a pointer corresponding to an address location in the memory array in which the first counter ID is stored;

incrementing the pointer to correspond to an address location in the memory array in which a second counter ID is stored; and reading, from the memory array, the second counter ID based on the pointer corresponding to the address location in the memory array in which the second counter ID is stored; wherein address locations in the memory array in which the first and second counter IDs are stored correspond to a predetermined period of time, and to a particular clock step associated with reading a counter ID.

2. The method of claim 1, further comprising:
setting the first counter ID as expired in response to reading the first counter ID from the memory array; and
setting the second counter ID as expired in response to reading the second counter ID from the memory array.

3. The method of claim 1, further comprising incrementing the pointer to correspond to the address location in the memory array in which the second counter ID is stored after a predetermined amount of time.

4. The method of claim 3, further comprising incrementing the pointer to correspond to an address location in the memory array in which a third counter ID is stored after the predetermined amount of time.

5. The method of claim 1, further comprising:
determining that the pointer has reached a boundary associated with the memory array; and
setting the pointer to correspond to a particular address location associated with the memory array that does not correspond to the boundary associated with the memory array.

6. The method of claim 1, further comprising organizing the first counter ID, the second counter ID, and subsequent counter IDs within the memory array according to a time at which each of the counter IDs is set.

7. An apparatus, comprising:
a memory array; and
a processing device coupled to the memory array, wherein the processing device is configured to:
increment a pointer that targets address locations in the memory array in which a plurality of counter identifiers (IDs) are stored, wherein the pointer is incremented after a predetermined period of time; and
cause respective particular counter IDs among the plurality of counter IDs to be read from the memory array when the pointer targets a respective address location in which a respective counter ID is stored;
wherein the predetermined period of time corresponds to an address location between a read pointer and a write pointer associated with the memory array and a period associated with clock steps associated with reading each of the plurality of counter IDs.

8. The apparatus of claim 7, wherein the processing device is configured to arrange the counter IDs within the memory array according to an amount of time that each of the counter IDs are set for.

9. The apparatus of claim 7, wherein counter IDs among the plurality of counter IDs comprise timing information corresponding to an amount of time associated with completion of a transaction involving a memory device.

10. The apparatus of claim 7, wherein:
the memory array and the processing device are deployed on a System-on-Chip (SoC), and
the processing device is configured to cause the memory array to enter a retention state subsequent to incrementing the pointer to reduce an amount of power consumed by the SoC.

11. The apparatus of claim 7, wherein the processing device is configured to set a counter ID that has been read from the memory array as an expired counter ID.

12. The apparatus of claim 7, wherein the processing device is configured to:
determine that an address location in the memory array is unallocated if the address location does not contain a counter ID; and
increment the pointer to an address location adjacent to the address location in the memory array that is empty to locate a next respective address location in which a next respective counter ID is stored.

13. The apparatus of claim 7, wherein the processing device is configured to:
determine that the pointer has reached a boundary associated with the memory array; and
set the pointer to correspond to a particular address location associated with the memory array that does not correspond to the boundary associated with the memory array.

14. A non-transitory computer-readable medium storing instructions that, when executed by a processing device, cause the processing device to:
increment a pointer that targets address locations in a memory array in which a plurality of counter identifiers (IDs) are stored, wherein the pointer is incremented after a predetermined period of time corresponding to a timer associated with at least one of the counter IDs; and
cause respective particular counter IDs among the plurality of counter IDs to be read from the memory array when the pointer targets a respective address location in which a respective counter ID is stored; wherein
the counter IDs among the plurality of counter IDs comprise timing information corresponding to respective chains of flip-flops coupled to the processing device.

15. The medium of claim 14, wherein the instructions are further executable by the processing device to cause the memory array to enter a retention state subsequent to incrementing the pointer to reduce an amount of power consumed by a computing system in which the processing device is deployed.

16. The medium of claim 14, wherein the predetermined period of time corresponds to a quantity of address locations between a read pointer and a write pointer associated with the memory array and a period of time between clock steps associated with reading each of the plurality of counter IDs.

17. The medium of claim 14, wherein the instructions are further executable by the processing device to set a counter ID that has been read from the memory array as an expired counter ID.

18. The medium of claim 14, wherein the instructions are further executable by the processing device to:
determine that the pointer has reached a boundary associated with the memory array; and
set the pointer to correspond to a particular address location associated with the memory array that does not correspond to the boundary associated with the memory array.

* * * * *